(12) United States Patent
Frederiksen et al.

(10) Patent No.: US 10,809,362 B2
(45) Date of Patent: Oct. 20, 2020

(54) DETECTOR ARRAY FOR A LIDAR SYSTEM

(71) Applicant: Robert Bosch GmbH, Stuttgart (DE)

(72) Inventors: Annette Frederiksen, Renningen (DE); Florian Mauch, Talheim (DE)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 16/017,553

(22) Filed: Jun. 25, 2018

(65) Prior Publication Data

US 2018/0372850 A1 Dec. 27, 2018

(30) Foreign Application Priority Data

Jun. 26, 2017 (DE) ........................ 10 2017 210 684

(51) Int. Cl.
*G01C 3/08* (2006.01)
*G01S 7/4863* (2020.01)
*G01S 7/481* (2006.01)
*G01S 17/42* (2006.01)
*G01S 17/931* (2020.01)

(52) U.S. Cl.
CPC .......... *G01S 7/4863* (2013.01); *G01S 7/4816* (2013.01); *G01S 7/4818* (2013.01); *G01S 17/42* (2013.01); *G01S 17/931* (2020.01)

(58) Field of Classification Search
CPC .... G01S 7/4863; G01S 7/4816; G01S 7/4818; G01S 17/931; G01S 17/42

USPC ........................................................ 356/5.01
See application file for complete search history.

(56) References Cited

U.S. PATENT DOCUMENTS

| | | | | |
|---|---|---|---|---|
| 7,391,024 B2* | 6/2008 | Garber | ................... | B82Y 20/00 136/255 |
| 10,502,618 B2* | 12/2019 | Droz | ..................... | G01S 7/4816 |
| 2018/0372554 A1* | 12/2018 | Laycock | .............. | G01N 21/645 |
| 2020/0036442 A1* | 1/2020 | Tiecke | ................. | H04B 10/112 |

* cited by examiner

*Primary Examiner* — Mark Hellner
(74) *Attorney, Agent, or Firm* — Norton Rose Fulbright US LLP; Gerard Messina

(57) ABSTRACT

A detector array for detecting backscattered light of a LIDAR system includes an optical waveguide and a detector unit. The optical waveguide includes a light incoupling surface, which is formed by at least a portion of a circumferential surface of the optical waveguide for coupling-in the backscattered light of the LIDAR system, and a light outcoupling surface, which is formed by a cross-sectional surface of the optical waveguide on an axial end of the optical waveguide, and furthermore a luminescent material, which is introduced into the interior of the optical waveguide and configured to emit light re-emitted into a wavelength range of a LIDAR system due to luminescence. The detector unit is situated on the light outcoupling surface of the optical waveguide for the detection of at least a portion of the re-emitted light.

12 Claims, 3 Drawing Sheets

DETECTOR ARRAY FOR A LIDAR SYSTEM

RELATED APPLICATION INFORMATION

The present application claims priority to and the benefit of German patent application no. 10 2017 210 684.0, which was filed in Germany on Jun. 26, 2017, the disclosure which is incorporated herein by reference.

FIELD OF THE INVENTION

The present invention relates to a detector array for a LIDAR system, to a LIDAR system including such a detector array, and to a vehicle including such a LIDAR system.

BACKGROUND INFORMATION

LIDAR (light detection and ranging) systems are used to detect the surroundings or objects in the surroundings of the LIDAR system. For this purpose, for example, laser pulses are emitted by a laser light source in a scanning manner, and the laser light backscattered on such an object is detected with the aid of a detector. From the propagation time of the signals and the velocity of light, it is possible to determine the distance from the location of the scattering, and thereby reconstruct surroundings.

LIDAR systems or LIDAR sensors are also increasingly used in the development of autonomous vehicles. LIDAR sensors of the related art frequently use a mechanically moved mirror to move one or multiple collimated light beam(s) across the scene to be observed. The same mirror is also used to guide the respective light backscattered from the scene onto a point detector. LIDAR sensors exist which directly measure the time of flight of short pulses (pulsed time of flight (TOF)), the phase shift of an amplitude modulation or the beat of a frequency modulation (FMCW). As an alternative to the mechanically moved mirrors, systems based on mechanical micromirrors, optically phased arrays and matrices of many light sources are provided for scanning the collimated beam.

On the side of the detector, however, the problem that remains is to detect light from a large angular range via a large aperture. It is physically not possible to minimize the étendue of a light field (product of the surface area and the angular range) with the aid of optical systems. It is thus also not possible to depict the total light penetrating a large surface area in a large angular range on a small surface area (point detector). All above-mentioned principles for avoiding the large mechanical mirror thus have in common that they are dependent on either a scanning detector optics system or a large-surface-area detector. Both alternatives are expensive and complicated.

SUMMARY OF THE INVENTION

According to the present invention, a detector array for a LIDAR system for the detection of backscattered light is provided. The detector array includes an optical waveguide and a detector unit. The optical waveguide includes a light incoupling surface, which is formed by a circumferential surface of the optical waveguide for coupling-in the backscattered light of the LIDAR system, and a light outcoupling surface, which is formed by a cross-sectional surface of the optical waveguide on an axial end of the optical waveguide, and furthermore a luminescent material, which is introduced into the interior of the optical waveguide and configured to emit light re-emitted into a wavelength range of a LIDAR system due to luminescence. The detector unit is situated on the light outcoupling surface of the optical waveguide for the detection of at least a portion of the re-emitted light.

In the present detector array, the backscattered light of the LIDAR system is advantageously not directly detected, but the light which is re-emitted, as a consequence of light incoupling of the backscattered light into the waveguide due to luminescence of the luminescent material, is detected. The light incoupling surface of the optical waveguide is formed by at least a portion of the circumferential surface of the optical waveguide. The light incoupling surface thus does not have to be the entire circumferential surface of an optical waveguide, but may also be only a portion of the circumferential surface, e.g., which may be the portion of the circumferential surface facing the incident light. The surface area of the detector unit corresponds to the surface area of the outcoupling surface of the optical waveguide, which in turn forms at least a portion of a cross-sectional surface of the optical waveguide.

The detector array according to the present invention thus has the advantage that the length of the optical waveguide, and thus the light incoupling surface, may be increased without having to change the size of the detector unit, since the size of the cross-sectional surface of the optical waveguide, and thus of the light outcoupling surface, does not change when the length of the optical waveguide is increased. Accordingly, the size of the detector aperture, which is defined by the light incoupling surface spanned by at least a portion of the circumferential surface of the optical waveguide, is decoupled from the size of the detector unit. Light from a large angular range may thus be guided via a large surface area onto a small (and fast) detector unit. Accordingly, a LIDAR system may thus be provided with a small detector unit, whereby oversized detector units may advantageously be avoided.

Possible luminescent materials are luminescent dyes. The luminescence destroys the directional information of the incident light, a portion of this re-emitted light being conducted with the aid of total reflection, or also directly along the optical waveguide in the axial direction, via the lateral outcoupling surface to the detector unit. The wavelength of the re-emitted light is typically slightly above the operating wavelength of the LIDAR system. The term "incoupling" within the scope of the present invention denotes the penetration of light into the interior of the optical waveguide.

Photodiodes may be considered as detector units, for example, other appropriate detector units also being possible for the detection of light.

A color filter may be positioned between the detector unit and the end of the optical waveguide, the color filter being configured as a Bragg filter. In conventional detector arrays, the color filter must have a complex large shape and be rendered angle-sensitive to prevent interfering light, such as sunlight, from reaching the detector unit. In the present invention, a simple Bragg filter may be used since the light beams propagating through the optical waveguide form a largely collimated light beam which covers only a small angular range. Bragg filters have a high filter efficiency. Furthermore, the small surface area of the required filter positively impacts the costs of the overall system since the filter costs directly correlate positively with the filter surface.

In a particular specific embodiment, the optical waveguide is configured in the form of a spiral. Advantageously, a large incoupling surface may be covered, whereby the aperture of the detector array is increased.

The at least one optical waveguide may be configured as a transparent film. In this way, both the optical waveguide and the luminescent material are transparent, transparent denoting the perviousness for the wavelength range visible to the human eye. Such an embodiment may advantageously be attached to windshields of vehicles, for example, without interfering with the field of vision of vehicle occupants.

In one particular specific embodiment, the detector array includes a multitude of optical waveguides having a respective assigned detector unit, each optical waveguide including an angle-selective element, each angle-selective element being configured for the selection of a certain angular range in such a way that the backscattered light is guided only from this particular angular range to the respective optical waveguide.

Based on a LIDAR system in a vehicle, the entire field of vision to be detected of a windshield is broken down or divided into individual fields of vision with the aid of the angle-selective elements, a certain optical waveguide being in charge of each field of vision range. Such a detector array may advantageously be used in systems which are more susceptible to interference, such as with so-called direct time of flight (TOF) methods using avalanche photodiodes (APDs), since the field of vision range, the so-called "field of view, per optical waveguide is accordingly decreased, and thus the respective signal-to-noise ratio of the reception signal is improved. The backscattered light may be transmitted from a certain field of vision range to a certain optical waveguide, while the remaining portion of the field of vision range is reflected or blocked, and thus does not reach this certain optical waveguide. Angle-selective elements may be optical instruments, for example.

Each angle-selective element may be configured to be wavelength-selective in such a way that only a certain wavelength range is guided to the optical waveguides, the operating wavelength of the LIDAR system being encompassed by the certain wavelength range. In this way, a further filter action is achieved.

The angle-selective element may be configured as a holographic optical component. In particular, these holographic optical components are volume holograms, which may be produced both as transmission holograms and as reflection holograms. Holographic optical components are particularly suitable for implementing a defined admission condition for a certain field of view range or angular range and a certain wavelength range. In a volume hologram, the admission condition may be precisely set with the aid of the layer thickness and refractive index modulation.

In one particular specific embodiment, at least one of the holographic optical components is composed of a multitude of subholograms. In this way, the admission condition for the angle and the wavelength may be defined even more precisely. These subholograms may be written into a holographic volume, for example, by holographic multiplexing, or alternatively by forming a stack made up of multiple holographic layers laminated on top of each other.

Furthermore, a LIDAR system including a laser light source for emitting laser light having a certain operating wavelength is provided. The operating wavelength is in the infrared range, for example. Furthermore, the LIDAR system includes a detector array for detecting the backscattered light according to one of the above embodiments. A possible laser light source is, in particular, a scanning laser.

Moreover, the present invention includes a vehicle which includes a LIDAR system described according to the above embodiments. The vehicle may be a motor vehicle, in particular a road-bound motor vehicle, for example a passenger car or a truck or a two-wheeler. In particular, autonomous passenger cars are possible, in which corresponding LIDAR systems may be used.

The at least one waveguide may be introduced into the windshield of the vehicle. In this way, an additional separate opening in the body of a vehicle may advantageously be dispensed with. The at least one detector unit is furthermore configured to be attachable to a pillar of a vehicle. The detector unit may thus be inconspicuously integrated and contacted on the lateral surface of the windshield. A possible vehicle pillar is, in particular, an A-pillar, depending on the application B-pillars, C-pillars or D-pillars also being possible, for example. Such an attachment is additionally space-saving and integratable into the body of a vehicle without major interventions in conventional vehicle concepts.

Advantageous refinements of the present invention are stated in the further descriptions herein, and as described in the description.

Exemplary embodiments of the present invention are described in greater detail based on the drawings and the following description.

DETAILED DESCRIPTION

Figure 1:
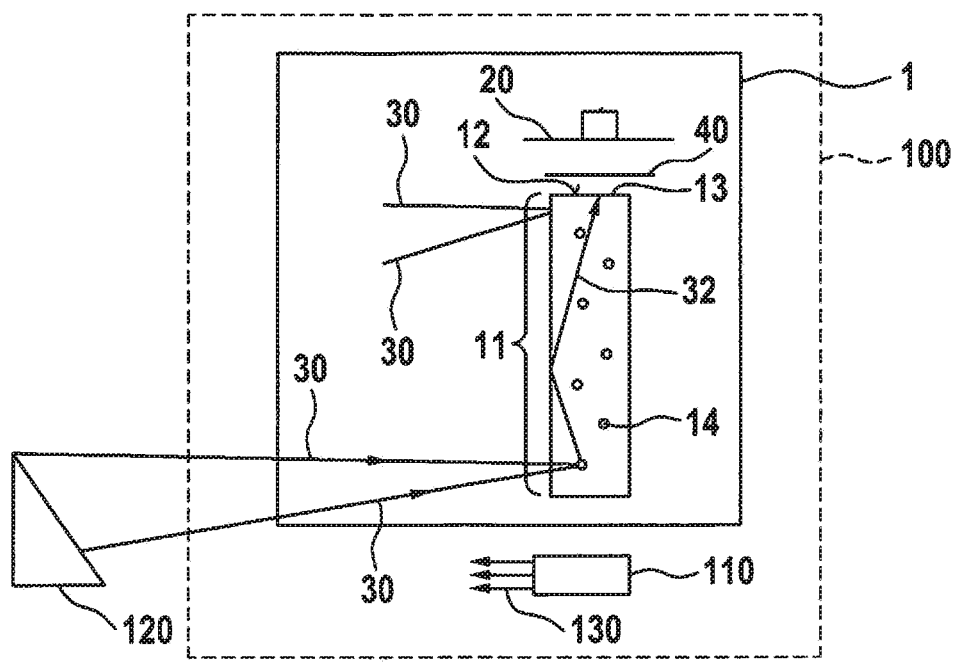
FIG. 1 shows a detector array for a LIDAR system according to a first specific embodiment.

FIG. 1 shows a detector array 1 for a LIDAR system 100 for detecting backscattered light 30 according to a first specific embodiment of the present invention. The light incident upon optical waveguide 10 is backscattered light 30 of a LIDAR system 100. In a LIDAR system 100, light 130 is emitted by a laser beam source 110 having a certain operating wavelength and backscattered by objects 120 or the surroundings. The surroundings may be illuminated, for example, in a scanning manner by laser beam source 110, the present invention not being limited thereto. Light 30 backscattered on objects 120 to be detected, which is backscattered in the direction of detector array 1, is then detected by detector array 1.

For this purpose, detector array 1 includes an optical waveguide 10, which is configured to couple at least a portion of backscattered light 30 into optical waveguide 10 via a light incoupling surface 11. Incoupling denotes the penetration of light into the interior of optical waveguide 10 here. Light incoupling surface 11 is formed by at least a portion of the circumferential surface of optical waveguide 10, which may be the portion facing backscattered light 30.

A luminescent material 14 is introduced into optical waveguide 10, luminescent material 14 may be present in the form of dyes, but not being limited thereto. This luminescent material 14 is matched in such a way that it luminesces in the wavelength range of backscattered light 30, i.e., it is thus also matched accordingly to the operating wavelength of emitted light 130 of LIDAR system 100. Due to the luminescence, further re-emitted light 32 is generated, optical waveguide 10 being configured to axially guide a portion of this re-emitted light 32 along the length of optical waveguide 10. This may take place, for example, with the aid of total reflection or also directly.

Furthermore, detector array 1 includes a detector unit 20, which is positioned on a light outcoupling surface 12 of optical waveguide 10 on an axial end 13 of optical waveguide 10. This detector unit 20 is configured to detect at least a portion of re-emitted light 32 conducted axially along optical waveguide 10.

Thus, backscattered light 30 of a LIDAR system 100 is not directly detected, but secondary light or re-emitted light 32 is detected, which arises due to the impingement of backscattered light 30 onto luminescent material 14 in the interior of optical waveguide 10. The luminescence of luminescent material 14 destroys the directional information of backscattered light 30 of LIDAR system 100 incident upon optical waveguide 10. A portion of this re-emitted light 32 is conducted in the axial direction of optical waveguide 10 and guided to outcoupling surface 12, and thus to detector unit 20, e.g., with the aid of simple, multiple total reflection or also directly. The wavelength of re-emitted light 32 is typically slightly below the operating wavelength of LIDAR system 100.

For detector array 1, the length of optical waveguide 10 may thus be arbitrarily increased, without having to change the surface area of detector unit 20. Accordingly, it is possible to guide light from a large angular range, which in FIG. 1 is indicated by two light fronts of backscattered light 30 which are incident from very different directions, via a large circumferential or light incoupling surface onto a small (and rapid) detector unit 20. Accordingly, the size of the detector aperture, which is defined by the surface area spanned by optical waveguide 10, is decoupled from the size of detector unit 20.

A color filter 40 may be positioned between detector array 1 and axial end 13 of optical waveguide 10 on outcoupling surface 12. Color filter 40 may, in particular, be configured as a simple Bragg filter. Due to the small selectable detector unit 20, the size of color filter 40 may also be small, so that advantageously only a small filter surface is required, and costs may thereby be saved. As an alternative, the wavelength selectivity of the luminescent material may also already achieve the desired filter effect.

Laser light source 110 of LIDAR system 100 may sample the surroundings or scenery in a scanning manner, for example, the present invention not being limited thereto. A corresponding evaluation unit for reconstructing the surroundings from the detected signals is not shown simply for the sake of clarity; such an evaluation unit is advantageously provided here and in the following figures.

Figure 2:
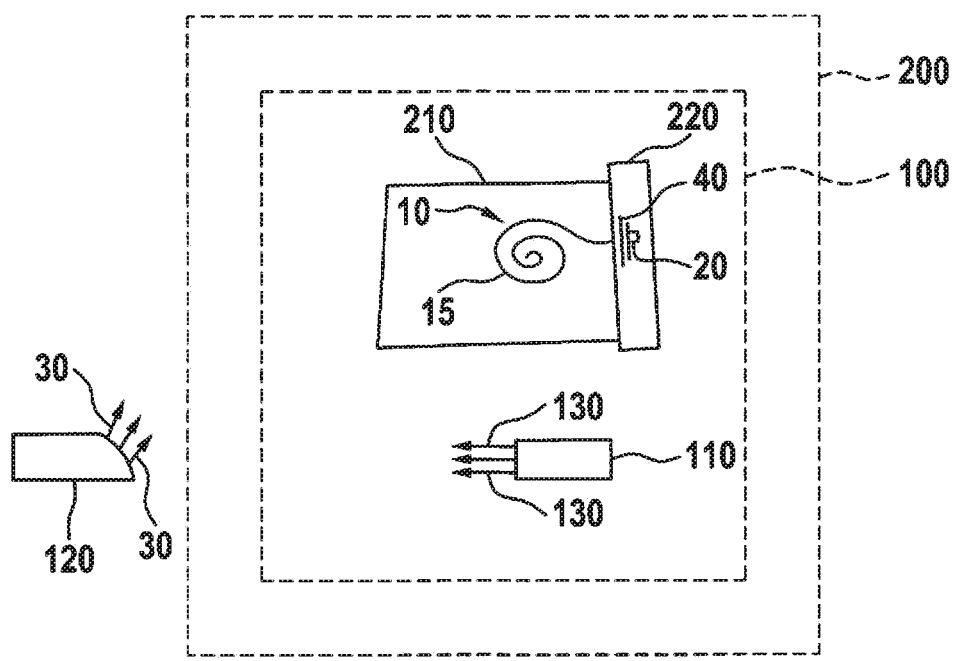
FIG. 2 shows a detector array for a LIDAR system on a windshield according to a second specific embodiment.

FIG. 2 shows a detector array 1, which, by way of example, is introduced into a windshield 210 of a vehicle 200, the present invention not being limited thereto. Optical waveguide 10 is configured in the form of a spiral 15 by way of example in this specific embodiment. In this way, a larger light incoupling surface 11 for optical waveguide 10 may be generated, whereby, accordingly, the detector aperture is also increased. The present invention, however, is not limited to a spiral shape. For example, other geometric embodiments may also be used, such as strip-shaped arrangements which result in a large light incoupling surface 11. Furthermore, in this embodiment variant, optical waveguide 10 is configured to be transparent by way of example, and in particular, by way of example, is configured as a transparent film. Accordingly, luminescent material 14 or the dye to be used for this purpose is also transparent.

Advantageously, this does not disadvantageously limit the field of vision for a driver or vehicle occupants of vehicle 200. Again, detector array 1 includes a color filter 40 configured as a Bragg filter here purely by way of example.

The actual detector unit 20 is integrated or introduced here purely by way of example on the edge of windshield 210 in the area of a vehicle pillar 220 of a vehicle 200. Vehicle pillar 220 may be an A-pillar of a vehicle. However, depending on the application, a B-pillar, a C-pillar or a D-pillar may also be possible. Such a positioning is inconspicuous, and furthermore detector unit 20 may be contacted on the lateral surface of windshield 210. Such an attachment is also space-saving and integratable into the body of a vehicle 200 without major interventions in conventional vehicle concepts.

This embodiment furthermore schematically describes a LIDAR system 100, which in addition to detector array 1 also includes a laser light source 110. For example, this laser light source 110 may sample the surroundings or objects 120 in a scanning manner, the present invention not being limited thereto.

Figure 3:
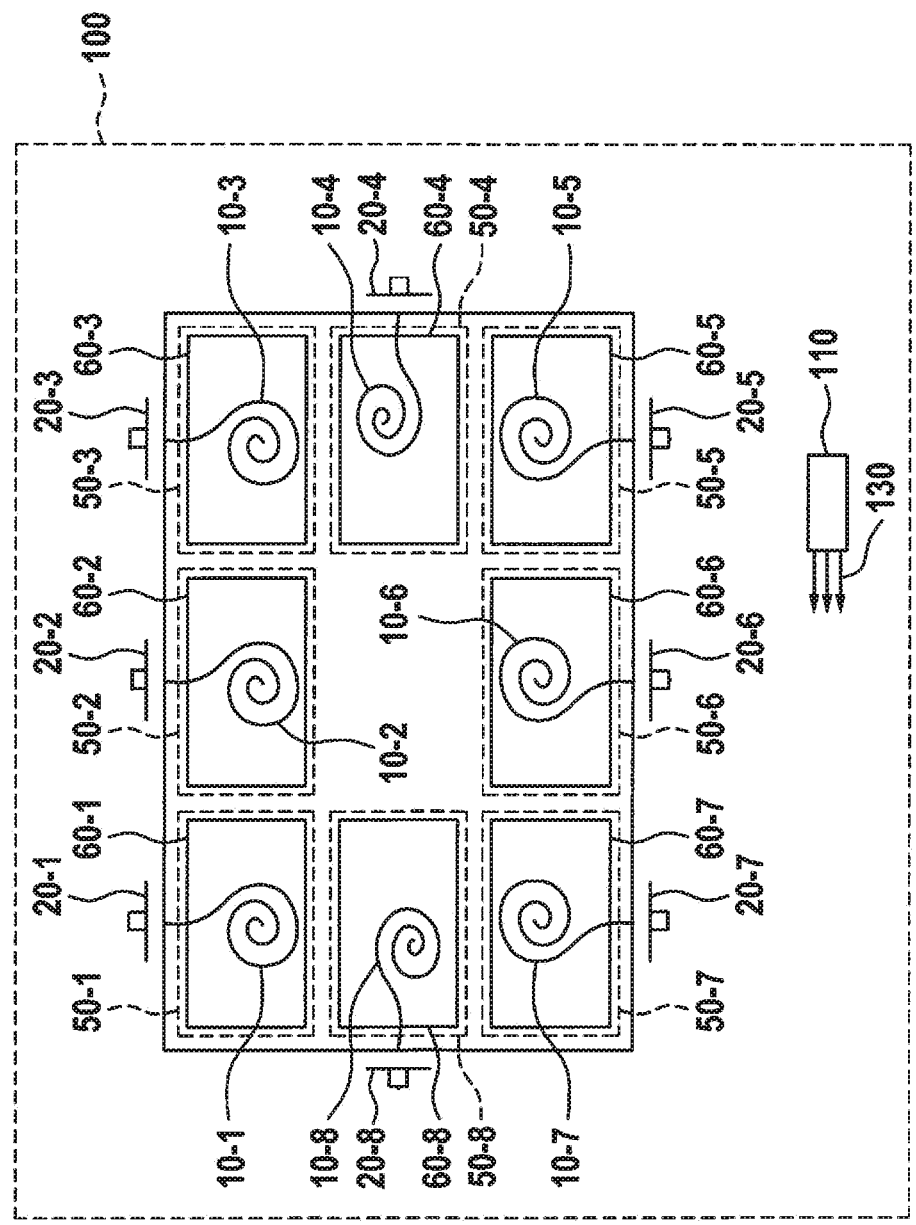
FIG. 3 shows a detector array for a LIDAR system on a windshield according to a second specific embodiment.

FIG. 3 describes a third specific embodiment of a detector array 1 for a LIDAR system 100. As in FIG. 2, detector array 1 is integrated into a windshield 210 of a vehicle 200, the present invention again not being limited thereto. As an alternative, such detector arrays 1 may also be used in areas outside the automotive field. In contrast to FIG. 2, this embodiment variant of detector array 1, however, includes a multitude of optical waveguides 10-1, . . . , 10-8 including a respective assigned detector unit 20-1, . . . , 20-8. Each individual optical waveguide 10-1, . . . , 10-8 including associated detector unit 20-1, . . . , 20-8 is essentially configured according to the properties described in FIG. 1. Again, optical waveguides 10-1, . . . , 10-8 are configured in the form of spirals 15 here purely by way of example, without limiting the present invention, in particular also by way of example as a transparent film as in FIG. 2. Purely by way of example, the number of optical waveguides is nine, the present invention not being limited thereto. Detector array 1 is thus divided into detector partial surfaces 50-1, . . . , 50-8.

Each detector unit 20 may be positioned on the edge of windshield 210. In particular, the detector units may, also by way of example, be integrated into a vehicle pillar 220 of a vehicle 200 analogously to FIG. 2. Furthermore, optical waveguides 10 are situated along the edge of windshield 210, so that a center portion of windshield 210 remains uncovered, and the field of vision of a driver is not impaired.

Each pair made up of optical waveguide 10-1, . . . , 10-8 and associated detector unit 20-1, . . . , 20-8 forms a receiving element. For example, first optical waveguide 10-1 and first detector unit 20-1 is a first receiving element, etc. Each receiving element, i.e., each pair made up of optical waveguide 10-1, . . . , 10-8 and detector unit 20-1, . . . , 20-8 is configured in this embodiment variant in such a way that it is only responsible for a certain, limited angular range 62-1, . . . , 62-8, which may also be referred to as a field of vision range (field of view) of the entire field of vision area, of light 30 backscattered by objects 120. For example, accordingly first optical waveguide 10-1 including associated first detector unit 20-1 is configured to detect a first angular range or field of vision range 62-1, etc.

For this purpose, each optical waveguide 10 includes an angle-selective element 60 in this embodiment variant. This angle-selective element 60 is configured for the selection of a certain wavelength range and a certain angular range or field of vision range 62 in such a way that only backscattered light 30 from this certain angular range or field of vision range 60 is guided to respective optical waveguide 10. For example, first angle-selective element 60 allows only backscattered light 30 from first angular range or field of vision range 62 to pass to first optical waveguide 10, etc.

The array may be configured in such a way that, accordingly, the entire field of vision is broken down or divided into individual, certain partial surfaces 50-1, . . . , 50-8, or angular ranges or field of vision ranges 62-1, . . . , 62-8 corresponding thereto. Different detector partial surfaces 50-1, . . . , 50-8 or angular ranges 62-1, . . . , 62-8 may be disjunctive, i.e., they are spatially separated and differ from one another, and it may be that there is no angular or field of vision range overlap.

Each angle-selective element 60 may be configured to be wavelength-selective. In particular, the wavelength range which encompasses the operating wavelength is allowed to pass through to optical waveguides 10, so that the laser light, and thus the wavelength of backscattered light 30, may be coupled into optical waveguide 10. Advantageously, a further filter property is thus achieved. In alternative specific embodiments, both angle-selective elements and additional wavelength-selective elements may be provided.

Holographic optical components 66 may be used as such an angle-selective element 60 having wavelength-selective properties. These may be configured as volume holograms. In holographic optical components 66 which are implemented as volume holograms, beam deflection is achieved by diffraction on a volume grating. These may be produced as transmission holograms or also as reflection holograms, new configurations being possible as a result of free selection of the incidence and reflection or diffraction angles. Advantageously, very deliberate pass-through conditions (wavelength, angle) may be set, so that with a holographic optical element 66 only light from a defined direction and having a defined wavelength is guided or transmitted to respective optical waveguide 10, and remaining angular range 64 is blocked or reflected.

Partitioning the field of vision range, as described in the above specific embodiments, advantageously causes the signal-to-noise ratio per optical waveguide 10-1, . . . , 10-8 and detector unit 20-1, . . . , 20-8 to be improved, and not be limited by the interfering light. In this way, such an array is, in particular, advantageous for LIDAR systems more susceptible to interference, for example for direct TOF methods using avalanche photodiodes.

Figure 4:
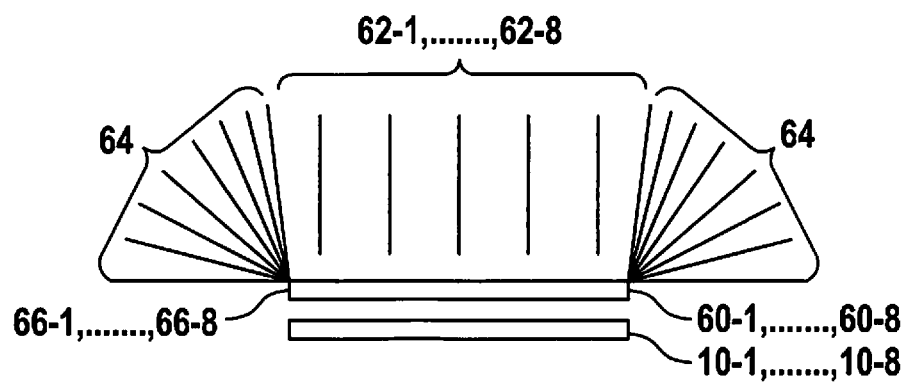
FIG. 4 shows a transverse view of an optical waveguide including an associated angle-selective element.

FIG. 4 shows a transverse view of optical waveguides 10 including a respective associated angle-selective element 60, which is configured as a holographic optical component 66 by way of example here. Holographic optical component 66 is configured as a thin layer by way of example here, which in this specific embodiment is applied to an associated optical waveguide 10 or an optical waveguide layer. Furthermore, a certain angular range or field of vision range 62 is schematically represented, from which light is coupled into respective optical waveguide 10. By way of example, a blocked field of vision range 64 is schematically indicated, from which no light may be coupled into optical waveguide 10.

An image for generating such a holographic optical component 66 may be take place either analogously or with the aid of a holographic printer. In mass production, it is possible in this way to manufacture just one master hologram and then duplicate it using the contact copy method. Furthermore, holographic optical component 66 used by way of example here may alternatively also be composed of a multitude of subholograms, whereby more certain admission conditions for angles and wavelengths may be achieved. These subholograms may be written into a holographic volume, for example, by holographic multiplexing, or alternatively by forming a stack made up of multiple holographic layers laminated on top of each other.

Figure 5:
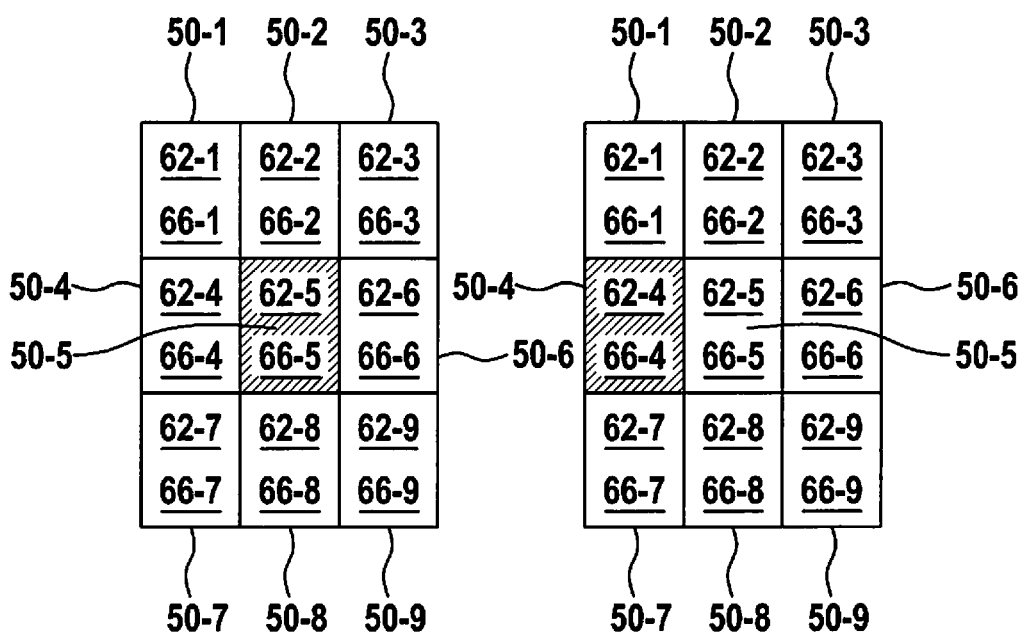
FIG. 5 shows a schematic representation of a partitioning of the field of vision.

For further illustration, FIG. 5 shows a schematic arrangement of a plurality of holographic optical components 66-1, . . . , 66-9 for partitioning the field of vision. As an alternative, other optical angle-selective elements 60-1, . . . , 60-9 may also be used. These holographic optical components 66-1, . . . , 66-9 are positioned above respective optical waveguides (not shown here), as in FIG. 4. Backscattered light, which is incident from a certain angular range or field of vision range, for example the fifth angular range or field of vision range 62-5, is only transmitted via associated fifth holographic optical component 66-5 or forwarded to the associated fifth optical waveguide, indicated by the hatched field. All remaining holographic optical components 66 block or reflect light from this exemplary fifth angular range or field of vision range 62-5. Analogously, the situation for a further certain angular range or field of vision range, which is the fourth field of vision range 62-4 here, is described in the right diagram. Furthermore, the division may be utilized to assign an incoming signal to a certain angular range or field of vision range.

What is claimed is:

1. A detector array for detecting backscattered light of a LIDAR system, comprising:
   an optical waveguide, including:
      a light incoupling surface, which is formed by at least a portion of a circumferential surface of the optical waveguide for coupling-in the backscattered light of the LIDAR system;
      a light outcoupling surface, which is formed by a cross-sectional surface of the optical waveguide on an axial end of the optical waveguide;
      a luminescent material, which is introduced into the interior of the optical waveguide and configured to emit light re-emitted into a wavelength range of a LIDAR system due to luminescence; and
      a detector unit, which is situated on the light outcoupling surface of the optical waveguide, to detect at least a portion of the re-emitted light.

2. The detector array of claim 1, wherein a color filter is positioned between the detector unit and the light outcoupling surface of the optical waveguide.

3. The detector array of claim 1, wherein the optical waveguide is configured in the form of a spiral.

4. The detector array of claim 1, wherein the optical waveguide includes a transparent film.

5. The detector array of claim 1, wherein the detector array is divided into a plurality of spatially separated detector partial surfaces, and each of the detector partial surfaces includes a detector unit, which additionally includes an angle-selective element in front of each optical waveguide in the light incoupling direction.

6. The detector array of claim 5, wherein each of the angle-selective elements is configured so that only light from a certain angular range is guided to the respective optical waveguide.

7. The detector array of claim 5, wherein each of the angle-selective elements is configured to be wavelength-selective so that only light from a predetermined light wavelength range is guided to the optical waveguides, the light wavelength range of the LIDAR system being encompassed by this certain wavelength range.

8. The detector array of claim 5, wherein each of the angle-selective elements is configured as a holographic optical component.

9. The detector array of claim 8, wherein at least one of the holographic optical components includes a plurality of subholograms.

10. A LIDAR system, comprising:
a laser light source for emitting laser light of a certain wavelength; and
a detector array for detecting backscattered light of a LIDAR system, including an optical waveguide, the optical wave guide including:
a light incoupling surface, which is formed by at least a portion of a circumferential surface of the optical waveguide for coupling-in the backscattered light of the LIDAR system;
a light outcoupling surface, which is formed by a cross-sectional surface of the optical waveguide on an axial end of the optical waveguide;
a luminescent material, which is introduced into the interior of the optical waveguide and configured to emit light re-emitted into a wavelength range of a LIDAR system due to luminescence; and
a detector unit, which is situated on the light outcoupling surface of the optical waveguide, to detect at least a portion of the re-emitted light.

11. A vehicle, comprising:
a LIDAR system, including:
a laser light source for emitting laser light of a certain wavelength; and
a detector array for detecting backscattered light of a LIDAR system, including an optical waveguide, the optical wave guide including:
a light incoupling surface, which is formed by at least a portion of a circumferential surface of the optical waveguide for coupling-in the backscattered light of the LIDAR system;
a light outcoupling surface, which is formed by a cross-sectional surface of the optical waveguide on an axial end of the optical waveguide;
a luminescent material, which is introduced into the interior of the optical waveguide and configured to emit light re-emitted into a wavelength range of a LIDAR system due to luminescence; and
a detector unit, which is situated on the light outcoupling surface of the optical waveguide, to detect at least a portion of the re-emitted light.

12. The detector array of claim 1, wherein a color filter is positioned between the detector unit and the light outcoupling surface of the optical waveguide, which includes a Bragg filter.

* * * * *